United States Patent [19]

Matsuoka et al.

[11] 4,393,342
[45] Jul. 12, 1983

[54] DOOR OPERATION CONTROL APPARATUS

[75] Inventors: Shigeru Matsuoka; Takeshi Tokunaga; Seiji Yonekura; Koji Yamauchi; Mitsuo Suzuki, all of Hitachi, Japan

[73] Assignee: Hitachi, Ltd., Tokyo, Japan

[21] Appl. No.: 329,046

[22] Filed: Dec. 9, 1981

[30] Foreign Application Priority Data

Dec. 12, 1980 [JP] Japan ................... 55-174593

[51] Int. Cl.³ .............................................. G05B 5/00
[52] U.S. Cl. ................................... 318/467; 318/282; 318/266
[58] Field of Search ................ 318/282, 286, 264–266, 318/466–468, 603, 626, 285; 49/26

[56] References Cited

U.S. PATENT DOCUMENTS

| | | | |
|---|---|---|---|
| 4,006,392 | 2/1977 | Catlett et al. | 318/467 X |
| 4,035,702 | 7/1977 | Pettersen et al. | 318/467 X |
| 4,234,833 | 11/1980 | Barrett | 318/468 X |
| 4,263,536 | 4/1981 | Lee et al. | 318/468 X |
| 4,328,540 | 5/1982 | Matsuoka et al. | 318/266 X |

Primary Examiner—Ulysses Weldon
Attorney, Agent, or Firm—Antonelli, Terry & Wands

[57] ABSTRACT

A motor for driving a garage door is controlled by a control unit, which counts the time required for the garage door to move between an upper limit switch and a lower limit switch. The control unit sets a comparison reference time on the basis of the time thus counted, and controls the motor in such a manner that the motor driving does not continue for a period of time longer than the comparison reference time.

12 Claims, 12 Drawing Figures

DOOR OPERATION CONTROL APPARATUS

FIELD OF THE INVENTION

The present invention relates to a door operation control apparatus and more in particular to a door operation control apparatus for a door operating system of a garage or the like, in which a fault of condition detector or a control circuit is compensated in a manner to maintain the door operating system in a safe condition.

BRIEF DESCRIPTION OF THE DRAWINGS

The present invention will be described with reference to the accompanying drawings, in which.

DESCRIPTION OF THE PRIOR ART

Figure 1:
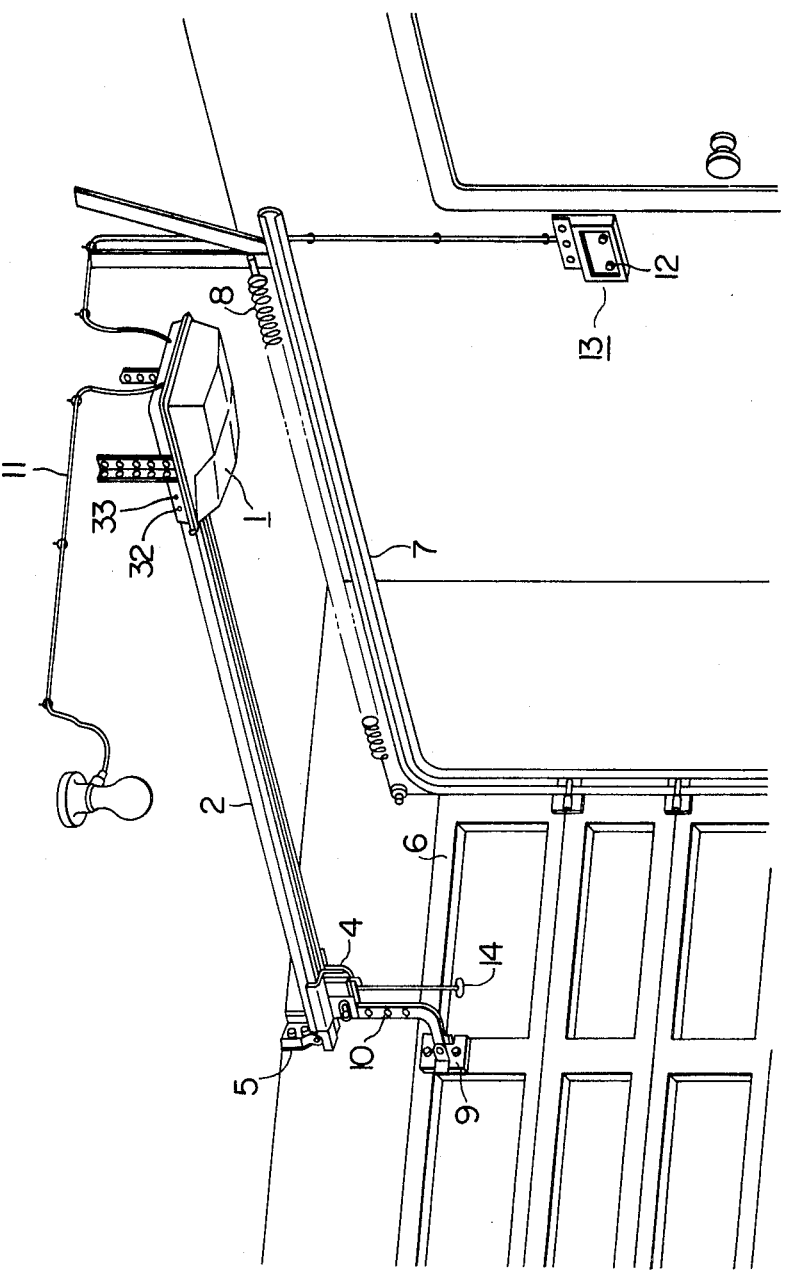
FIG. 1 is a view of the general mounting arrangement of a conventional garage door operating device.
Figure 2:
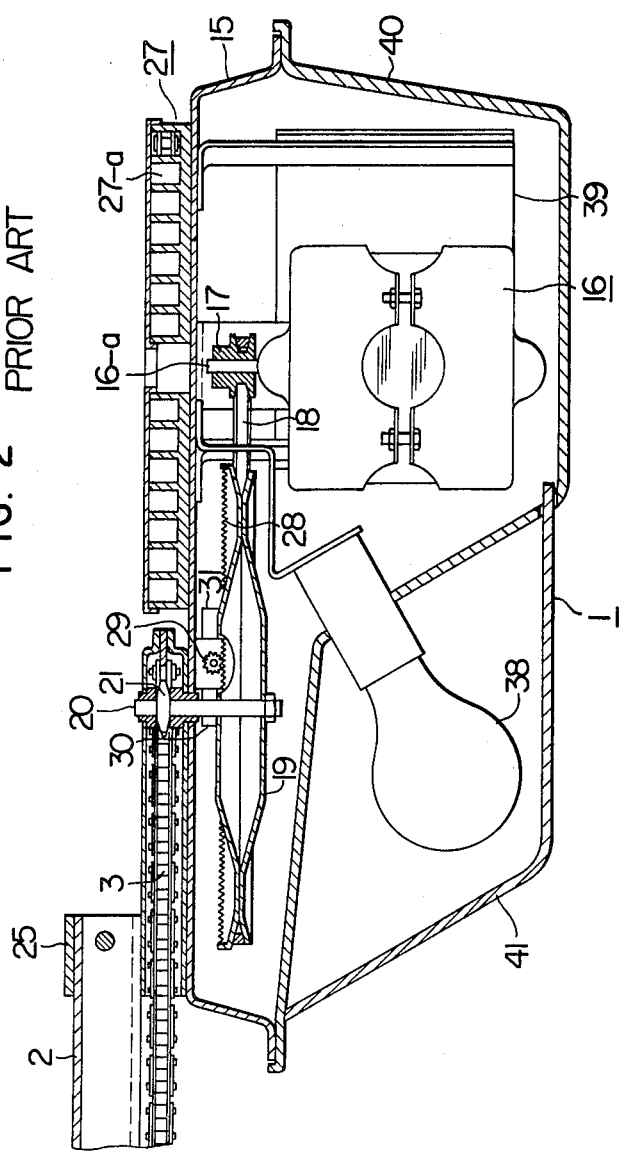
FIG. 2 is a side sectional view of the essential parts thereof.
Figure 3:
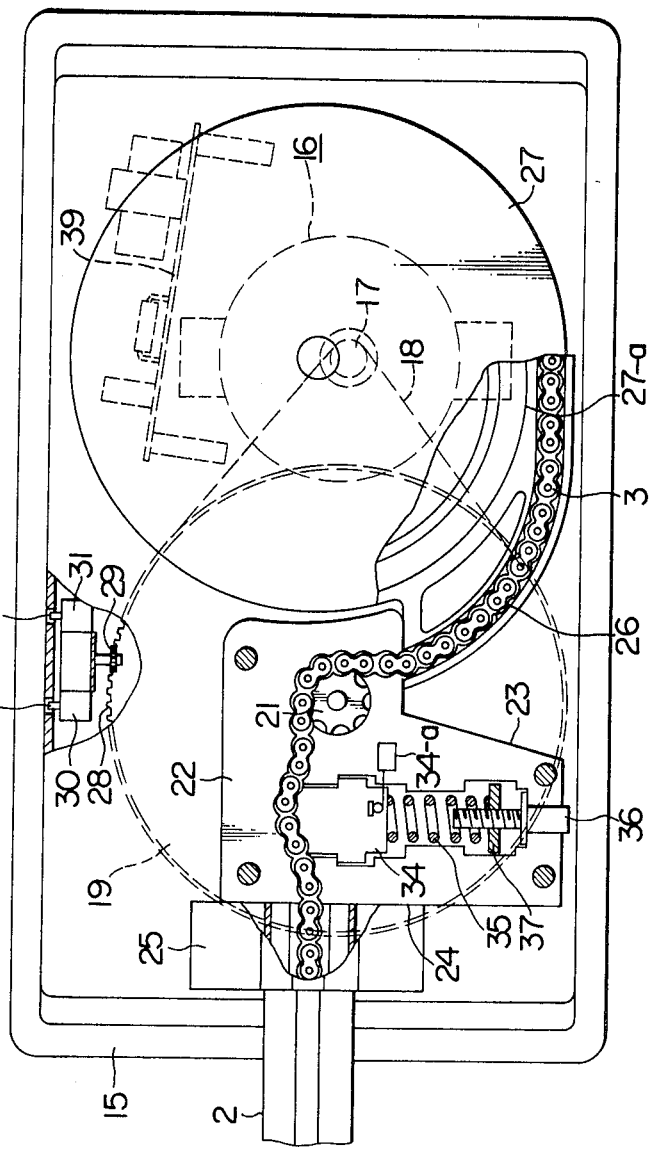
FIG. 3 is a partly cut-away top plan view thereof.

Generally, a door operating system for a garage or the like, as described in the U.S. Pat. No. 4,328,540, is arranged as shown in FIGS. 1 to 4.

The garage door operating system under consideration comprises, as main parts, a body 1 having a driving unit for driving a door 6 and being suspended from the garage ceiling, a rail 2 fixed to a wall part of the garage by a header bracket 5, a roller chain 3 adapted to be actuated by the body 1, and a trolley 4 horizontally moved along the rail 2.

The garage door 6 is biased by an unbalanced spring 8 so as to balance its weight thereby facilitating its opening and closing operation along a door rail 7. A door bracket 9 fixed on the door is rotatably connected to the trolley 4 through a door arm 10 making up connector means for connecting a driving unit later described and the door.

In this construction, the garage door 6 is movable along the door rail 7 for opening and closing operation by the roller chain 3 driven by the body 1 and the trolley 4 horizontally moved thereby.

Numeral 11 designates a power cable. An operating command to the body 1 is issued by a control unit 13 which produces a control signal when a push button switch 12 mounted on the wall of the garage is depressed or when a signal is received by a built-in receiver from a transmitter in the form of an electric wave or the like. The push button switch 12 and the control unit 13 make up door operating command means.

Numeral 14 designates a releasing string for decoupling the roller chain 3 from the trolley 4 thereby making it possible to manually open or close the garage door 6 when the garage door operating system becomes inoperative due to a power failure or the like.

The turning effort of the motor 16 fixed on the underside of the body frame 15 of the body 1 is transmitted to a sprocket 21 in mesh with the roller chain 3 through a motor shaft 16-a, a motor pulley 17, a V-belt 18, a large pulley 19 and a sprocket shaft 20. These components and the rail 2 and the trolley 4 make up a door driving mechanism.

Numerals 22, 23 and 24 designate chain guides A, B and C for guiding the rollers of the roller chain 3 from both sides in the body frame 15. The rail 2 is fixed by a rail fixing metal fitting 25 in such a manner that there is no misalignment or gap with the groove formed by the chain guides A22 and C24. The roller chain 3 is accommodated in the groove formed by the chain guides A22 and B23 and the chain accommodating groove 26 of a fixed chain accommodating case 27.

Numerals 30 and 31 designate upper-limit and lower-limit switches respectively making up a limit mechanism for providing the upper and lower limits in operation of the garage door, namely, the amount of horizontal movement of the trolley 4. The amount of movement of the pulley rack 28 provided on the outer periphery of the large pulley 19 is transmitted to the limit mechanism through a pinion 29. The upper-limit and lower-limit switches 30 and 31 are provided with an upper-limit adjusting knob 32 and a lower-limit adjusting knob 33 which are accessible from outside of the body for adjustment of the upper and lower limits.

Numeral 34 designates an obstruction detector member which is movable by the compressive force or tensile strength applied to the roller chain 3 when it moves through a curved portion of the chain guide groove formed by the chain guides A22, B23 and C24 at the time of door upward or downward movement. The compressive force of the obstruction spring 35 for limiting the movement of the obstruction detector member 34 may be freely changed by moving the spring holder 37 by turning the obstruction operating force adjusting screw 36.

An obstruction detection switch (obstruction detecting limit switch) 34-a, which is turned on or off by the movement of the obstruction detector member 34, is provided to cause the door to be moved upward if it is moving down or to stop if it is moving up upon detection of an obstruction when the garage door 6 hits thereon.

Numeral 38 designates a lamp for illuminating the inside of the garage which is adapted to be turned on and off in interlocked relation with the movement of the garage door 6. Numeral 39 shows a controller fixed on the body frame 15 for the lamp 38 and the motor 16, numeral 40 a body cover, and numeral 41 a translucent lamp cover.

Figure 4:
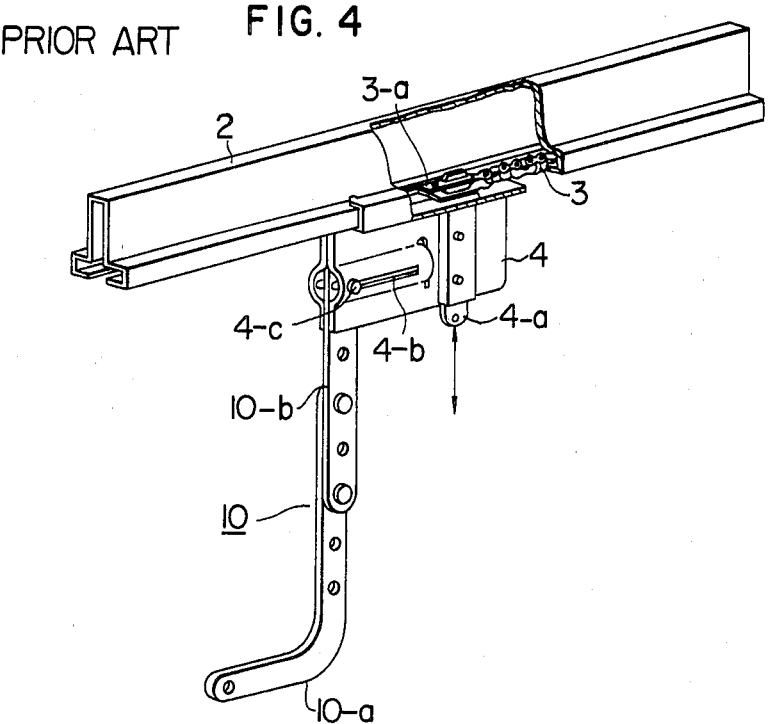
FIG. 4 is a partly cut-away perspective view of the trolley mounting section.

The rail 2 is made of a thin iron plate or a plastic plate and is configured, as shown in FIG. 4, to support at its outside slidably the trolley 4 and to guide the roller chain 3 for its reciprocal linear movement through a path defined between the respective sides thereof. The trolley 4 and the roller chain 3 are coupled to each other by the connector member 4-a inserted into the groove of the roller attachment 3-a. The connector member 4-a is vertically slidable and is pushed up normally by a spring or the like.

At the time of a power failure or the like, the garage door operating system and the garage door 6 are separated from each other in order to manually open or close the door. For this purpose, the connector member 4-*a* is pulled downward to release it from the roller attachment 3-*a*.

The door arm 10 is comprised of an L-shaped door arm 10-*a*, a straight door arm 10-*b* and connecting means for connecting them together such that the effective length of the door arm 10 may be changed freely in accordance with the positional relation between the garage door 6 and the door rail 7. The door arm 10 and the trolley 4 are coupled with each other by a pin 4-*c* which is normally pressed to the position as shown in FIG. 4 by a spring or the like and is slidable through a slot 4-*b* formed in the trolley 4 thereby to absorb the shock at the time of collision with an obstruction during the downward movement of the garage door 6.

Further, it is desired to prevent the garage door from reverse movement upon detection of an obstruction during downward movement due to the raising of the floor level which may happen in the presence of snow or ice on the floor, or a small article such as a water hose or the like. For this purpose, it is arranged that the door is not reversed but is stopped even upon detection of an obstruction within the range of 2 inches above the floor level. In this case, the difference of movement of the trolley 4 and the garage door 6 is compensated by the slot 4-*b*.

Let us study a method of controlling the operation of the garage door 6 as mentioned above. The circuit for controlling the door operation is required to control a driving unit by accurately processing the inputs from the upper and lower limit switches 30, 31 and the obstruction detection switch 34-*a* making up an obstacle detector.

In this processing system, the following conditions result in an operating failure of the control:

(1) the inoperativeness of the upper limit switch 30 or the lower limit switch 31, (2) the inoperativeness of the obstruction detection switch 34-*a*, and (3) the inoperativeness of a circuit for producing a command output to the driving unit. The fault (1) above does not pose a serious problem by itself in view of the fact that the mechanical limit of movement of the door at the upper and lower positions thereof should cause the obstruction detector switch 34-*a* to be actuated. Nevertheless, the door control becomes impossible if the obstruction detection switch 34-*a* becomes inoperative simultaneously with the upper and lower limit switches.

In the event that the door control becomes impossible, serious accidents as described below may occur if an obstacle should be in the way of the door. If the motor 16 is locked so that the lock torque thereof is applied to the obstacle, the obstacle is damaged. This condition continues until a thermal protector of the motor 16 is activated, and in an extreme case, the motor 16 burns causing a fire. If the obstacle is a person, he may be seriously injured or killed.

The conventional protective means for such a situation uses the mechanism for transmission of the driving power of the driving means. For instance, power is transmitted through a belt and a pulley provided with an adjusting mechanism for giving a predetermined tension to the belt, so that the belt may slip in response to a force exceeding a certain limit. In this method, however, the belt may be broken by being worn while slipping with the motor 16. Also, the mechanism is complicated and high in cost. Further, a force continues to be exerted undesirably on the obstacle until the thermal protector of the motor 16 is actuated. Furthermore, the service life of the motor 16 is shortened by supplying power thereto until the thermal protector is actuated.

SUMMARY OF THE INVENTION

The object of the present invention is to provide a door operation control apparatus suitable for assuring safety against any fault of the condition detector means or the control circuit.

As a result of studying the time required for the garage door to move, we have found that such a time is dependent on the weight balance of the garage door involved, the source voltage, frequency, motor characteristics, the distance covered by the garage door in its movement and the ambient temperature (control characteristics). If a fixed time is used as a reference time for comparison with the time required irrespective of change of the above factors, it will be required to select such a value of the fixed time as covering a great range of factors, resulting in a low efficiency. According to the present invention, therefore, the time required for the garage door to move between an upper limit switch and a lower limit switch is counted, and this value is used to determine a comparison reference value, with which the time actually required by the movement of the garage door is compared. In this way, a most efficient fault detecting means is provided and the output thereof is used to stop or reverse the movement of the garage door or at least control the operating conditions of the garage door.

According to the present invention, there is provided a garage door operation control apparatus comprising time counting means for counting the time required for movement of a garage door, specified section detector means for detecting a specified section, and memory means for storing the count value of the time counting means in response to the output from the specified section detector means, in which the specified section detector means includes specified switches such as upper and lower limit switches positioned in and opposite to the direction of initial door movement, the output of which cause the time count to be stored in the memory means. The comparison reference value is produced by calculation on the basis of the time count as stored. Further, the time counting means is actuated in synchronism with the start in operation of the garage door, and when the count value exceeds the comparison reference value, it is determined that the door operation is abnormal, so that the moving condition of the garage door is changed to compensate for the faulty function.

According to one aspect of the present invention, there is provided a door operation control apparatus comprising door operating means including a driving unit for driving the door and connector means for connecting the driving unit with the door, and a control unit for providing a predetermined command to the door operating device, in which the control unit includes time counting means for counting the time required for movement of the door, specified section detector means for detecting the count value for a specified section, and memory means for storing the count value in response to the output of the specified section detector means. The specified section detector means is started by the output change of a specified switch positioned opposite to the direction of door movement at the time of door start, and the count value is stored in the memory means in response to the output change of a specified switch positioned in the direction of the door movement. A comparison reference value is produced by calculation on the basis of the count value. The time counting means is started in synchronism with the door operation start, and in the case where the count value exceeds the comparison reference value, the door operating condition is controlled through the door operating device.

According to another aspect of the present invention, there is provided a garage door operation control apparatus comprising a door operating device including a driving unit for driving the door and connector means for connecting the driving unit to the door, and a control unit for issuing a predetermined command to the door operating device, wherein the control unit includes time counting means for counting the time required for door movement, specified section detector means for detecting the count value for a specified section, memory means for storing the count value in response to the output of the specified section detector means, means for setting a fixed reference value and a fixed set value, each being longer than the regular door movement time. The specified section detector means is started by an output of a specified switch positioned opposite to the direction of the door movement at the time of door start, and the count value is stored in the memory means by the output change of a specified switch positioned in the direction of the door movement. On the basis of the count value, a calculation is made to produce a comparison reference value. This comparison reference value or a set reference value determined on the basis of the fixed reference value is used as a reference input to be compared with the count value of the time counting means which is started with the start of the door operation, and when the counted value exceeds the comparison reference value or the set reference value, or when the comparison reference value exceeds the fixed set value, the door operating condition is controlled through the door operating device.

DETAILED DESCRIPTION OF PREFERRED EMBODIMENTS

Now, an embodiment of the present invention will be described with reference to FIGS. 5 to 11.

Figure 5:
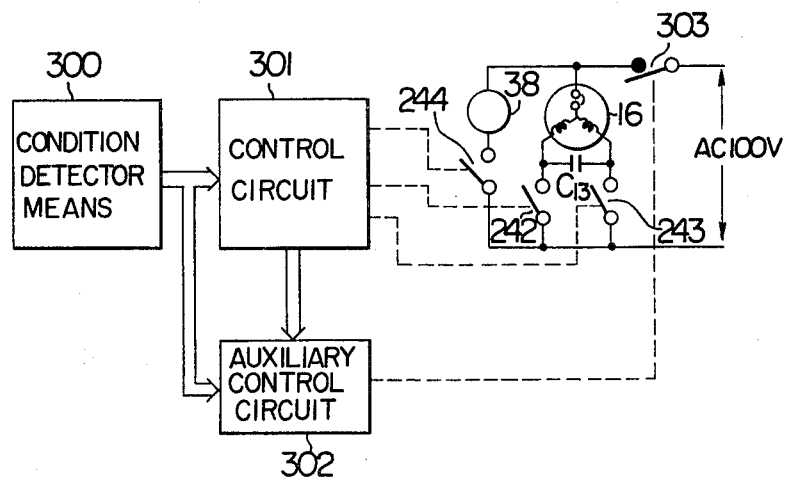
FIG. 5 is a fundamental block diagram showing a door operation control apparatus according to an embodiment of the present invention.

First, in FIG. 5, numeral 300 designates condition detector means, numeral 301 a control circuit, numeral 302 an auxiliary control circuit, numeral 303 a relay contact of the relay RY4 (FIG. 9) described later, numerals 16 and 38 the motor and the lamp described above, and numerals 242 to 244 relay contacts (FIG. 6) described later.

The condition detector means 300 includes upper and lower limit switches 202 and 203 and an obstruction detector switch 204 described later. The output of the condition detector means 300 is applied to the control circuit 301, by which the garage door 6 is controlled for opening and closing.

Further, the outputs of the condition detector means 300 and the control circuit 301 are applied to the auxiliary control circuit 302. The auxiliary control circuit 302 includes time counting means and acts, in the case of detection of an abnormal condition, to open the relay contact 303 in thereby to stop the opening or closing operation of the garage door. The control circuit 301 and the auxiliary control circuit 302 are contained in the body 1.

Figure 7:
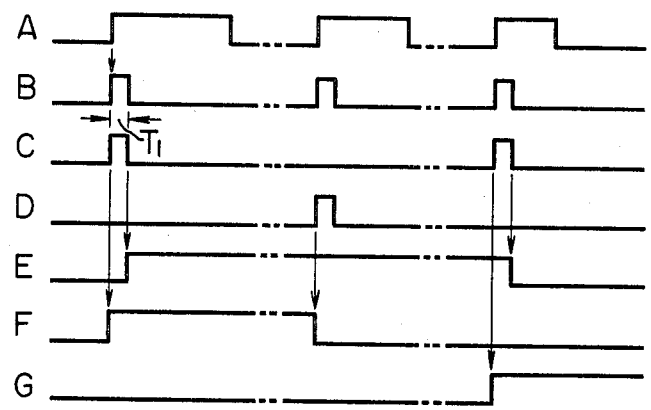
FIGS. 7 and 8 are time charts for the apparatus of FIG. 5.
Figure 8:
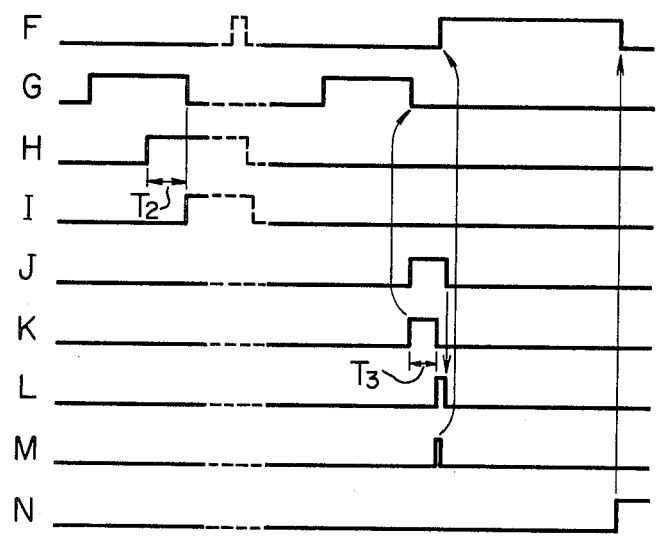

The construction and operation of the control circuit 301 will be explained with reference to FIGS. 6 to 8.

Figure 6:
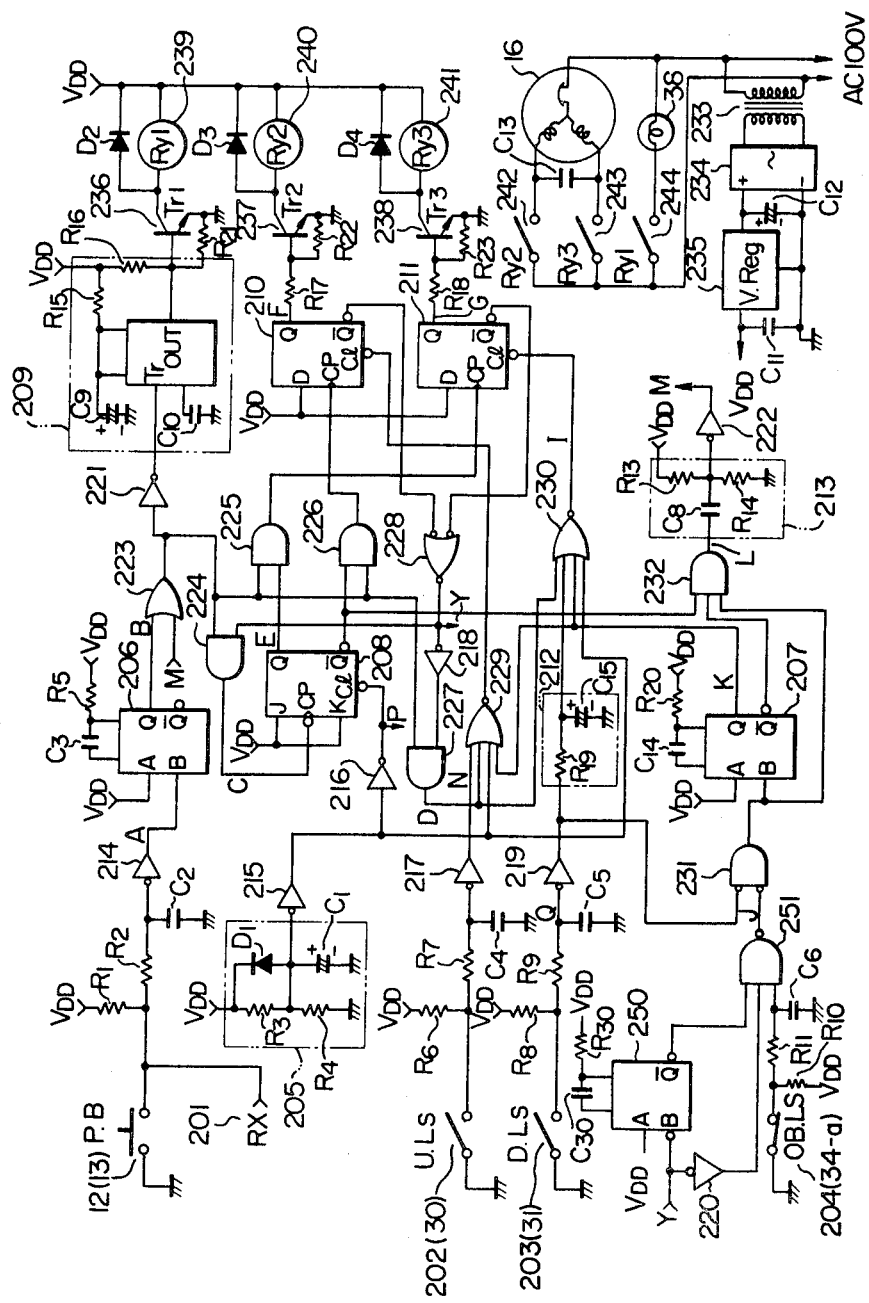
FIG. 6 is a diagram showing a control circuit for the apparatus of FIG. 5.

First, in FIG. 6, numeral 12 designates a push button switch for issuing a door operation command as explained above, numeral 201 (Rx) an output for the door operation command produced by the push button switch 12 or the control means 13 in the control unit. Numerals 202, 203 and 204 (U.Ls, D.Ls, OB.Ls) show upper and lower limit switches and an obstruction detection switch respectively making up specific switches corresponding to the aforementioned upper and lower limit switches 30 and 31 and the obstruction detection switch 34-a, thus making up means equivalent to the condition detector means 300.

Numeral 205 designates a power reset circuit for producing a reset signal at the time of the rise of power, numerals 206, 207, 250 designate monostable multivibrators, numeral 208 a J-K master-slave flip-flop, numeral 209 a timer circuit including NE555 (Sygnetics) or a similar integrated circuit, numerals 210 and 211 D-type flip-flops, numeral 212 an integrator circuit, numeral 213 a differentiator circuit, numerals 214 to 222 NOT elements, numeral 223 a 2-input OR element, numerals 224 to 228 4-input NOR elements, numeral 213 a 2-input NOR element, numeral 232 a 3-input AND element, numeral 251 a 3-input NAND element, numeral 233 a transformer for the control power supply, numeral 234 a diode stack, numeral 235 an IC regulator for the control power supply, numerals 236 to 238 relay-driving transistors ($Tr_1$ to $Tr_3$) for the relays RY1, RY2 and RY3 respectively, numerals 239 to 241 relay coils for the aforementioned respective relays, numerals 242 to 244 relay contacts for the aforementioned respective relays, reference character VDD a control power supply, characters D1 to D4 diodes, characters R1 to R11, R13 to R23 and R30 resistors, and characters C1 to C6, C8 to C15 and C30 capacitors.

The operation of this circuit will be explained below with reference to the time charts of FIGS. 7 and 8.

When power is thrown in this circuit, a control source voltage VDD is supplied from the transformer 233 through the diode stack 234 and the IC regulator 235. The rise point of signal VDD is integrated by the power supply reset circuit 205 so that a reset pulse is produced through the NOT element 215. The reset pulse resets the J-K master slave flip-flop 208 through the NOT element 216, and further resets the D-type flip-flops 210 and 211 through the 4-input NOR elements 229 and 230.

Assuming that the NOT element 214 produces a signal A is response to the turning on of the push button switch 12 making up a door operation command or the turning on of the relay contact output terminal 201 connected with the radio receiver, the monostable multivibrator 206 produces a signal B of pulse width T1 at the rise point of the signal A. This signal B is applied through the 2-input OR element 223 to the 2-input AND element 224. A signal C is thus produced. The signal C is applied as a clock pulse signal to the J-K master slave flip-flop 208. During the high state of the signal C before reversal of the output signal E of the flip-flop 208, the output of the 2-input AND element 226 is applied as a clock input signal to the flip-flop 210, so that the flip-flop 210 is set, thereby producing a signal F. With this signal as a door up drive command, the transistor 237 excites the relay coil 240 for door upward movement. Thus the relay contact 242 is closed, driving the motor 16 in forward direction.

In this way, the motor 16 is started. At the same time, the signal B is applied as a trigger signal to the timer circuit 209 through the NOT element 221. This operation is intended to keep the lamp 38 ON for a predetermined length of time after the issue of the door operation command for illuminating the inside of the garage simultaneously with the start of the motor 16. For this purpose, the output of the timer circuit 209 excites the relay coil 239 through the transistor 236, and closes the relay contact 244. As a result, the lamp 38 is lit for a predetermined length of time.

Next, if the upper limit switch 202 is turned on during the production of an up command output, the flip-flop 210 is reset through the NOT element 217 and the 4-input NOR element 229, so that the transistor 237 is turned off, the relay coil 240 is de-energized, the relay contact 242 is opened, and the motor 16 stops. In the case where an operation command is issued again at the press of the push button switch 12 or by the turning on of the relay contact output 201 connected with the control section 13, during the production of the up command, on the other hand, the pulse signal B is produced from the monostable multivibrator 206 as mentioned above, so that an output is produced from the 2-input OR element 223. In view of the fact that the D-type flip-flop 210 is set, however, the output of the 2-input AND element 228 is "low", thus prohibiting the output of the 2-input AND element 224. The output of the NOT element 218 is "high", and therefore, the pulse signal B is produced in the form of signal D from the 2-input AND element 227. This signal D is applied through the 4-input NOR element 229 to the D-type flip-flop 210 as a reset signal. In this way, the motor 16 is stopped in this case, too. Upon receipt of another operating command under this condition, the output of the 2-input AND element 226 is prohibited in view of the fact that J-K master-slave flip-flop 208 is set, so that the signal B is produced from the 2-input AND element 225 and the D-type flip-flop 211 is set, thus producing the signal G. As a result, the transistor 238 is turned on, the door down drive relay coil 241 is excited, the relay contact 243 is closed, the motor 16 is driven in the reverse direction, and thus the door is moved down.

If the lower limit switch 203 is turned on during the downward movement, a signal H is produced from the NOT element 219 and, after being delayed by time T2 at the integrator circuit 212, is applied as a reset signal I to the flip-flop 211 via the 4-input NOR element 230. In this way, the motor 16 is stopped as in the case of the upper limit switch being turned on during upward movement.

Next, the operation of the circuit with the obstruction detecting switch 204 turned on will be explained. Assume that the obstruction detection switch 52 is turned on when the door is moving up, i.e, when the J-K master slave flip-flop 208 is set, the D-type flip-flop 210 is set and the D-type flip-flop 211 is reset. In view of the fact that the obstruction detection switch 204 is closed at contact B, it is turned off. Thus, a "high" signal is applied from the 2-input NOR element 231 as a result of the output of the 3-input NAND element 251, and triggers the monostable multivibrator 207. The Q output pulse of the monostable multivibrator 207 resets the D-type flip-flop 210 through the 4-input NOR element 229. At this time, the J-K master slave flip-flop 208 is set and therefore the output of the 3-input AND element 232 is prohibited.

Next, assume that the obstruction detection switch 52 is turned on during the downward movement, i.e., when the J-K master slave flip-flop 208 is reset, the D type flip-flop 210 is reset and the D-type flip-flop 211 is set. A signal J is produced from the 3-input NAND element 251 and applied through the 2-input NOR element 231, and a signal K with pulse width T3 is produced from the monostable multivibrator 207. This signal K resets the D-type flip-flop 211 through the 4-input NOR element 230. As a result, the motor 16 is stopped and the door stops moving down. Further, at the trailing edge of the pulse signal K, the output $\bar{Q}$ of the monostable multivibrator 207 rises so that the 3-input AND element 232 produces a "high" signal L. This signal L is converted into a signal M through the differentiator circuit 213 and the NOT element 222 and is applied to the 2-input OR element 223. In this way, a signal F which is an up command is produced from the above-mentioned control process, with the result that the door moves up until the turning on of the upper limit switch 202 and the resulting signal which is an output signal N of the NOR element 217 stops the door.

As will be seen from the foregoing description, when the door detects an obstruction, the door is immediately stopped if moving up, and it is immediately stopped and begins to move up after the time period of T3 if it is moving down, thus securing the operating safety of the system. In order to prevent the obstruction detection means from being unduly actuated by a small obstacle such as a stone or a rod located near the door lower limit or the rise of the floor level due to snow in winter, the turning on of the lower limit switch 203 causes the 2-input NOR element 231 to immediately prohibit the subsequent operation of obstruction detection, and the signal G making up a down command is reset by a signal I with time delay T2 produced from the integrator circuit 212, thus stopping the door. During the door stoppage, the output of the obstruction detection switch 52 is prohibited by the NOR element 231. In case where a small obstacle is located near the door lower limit, the switch 52 is off. Also in the case where the door stops with the obstruction detection switch being actuated while the door is moving up, the switch 204 is generally off. In order to assure smooth door starting, at the trailing edge of the output Y of the 2-input AND element 228, namely, in response to a door start signal, the monostable multivibrator 250 is triggered and the output thereof is applied to an input of the 3-input NAND element 251 thereby to ignore the obstruction detection signal as long as the particular output is produced. The negligence of the obstruction detection signal during door stoppage is of course attained by applying the output Y of the 2-input AND element 228 to the 3-input NAND element similarly through the NOT element 220.

Now, explanation will be made of the auxiliary control circuit 302 shown in FIG. 5 with reference to FIGS. 9 to 11.

Not only in these drawings but also in FIG. 12 described later, numerals 304, 307, 315, 321, 321-0 to 321-n, and 322 designate buffer elements; numerals 305 and 308 differentiator circuits; numeral 306 a flip-flop circuit; numerals 309 and 312 NOT elements; numeral 310 an integrator circuit; numerals 311, 313, and 317 2-input AND elements; numeral 314 a flip-flop; numeral 316 an oscillator circuit; numerals 318 and 320 counters; numerals 322, 328, and 372 transistors; numerals 325, 330, 350, and 351 operational amplifier elements; numerals 326; 370 comparator elements; numeral 327 a D-type flip-flop; numeral 329 a relay (Ry4); numerals 331 and 332 converter circuits; numeral 340 a change-over switch; and numeral 371 a 2-input OR element.

Numerals R31 to R47, R50 to R55, R70 to R73, R80, R81 R39-1 to R39-n, R40-0 to R40-n designate resistors; numerals C31 to C32 capacitors; and numerals D5 to D7 diodes.

Figure 9:
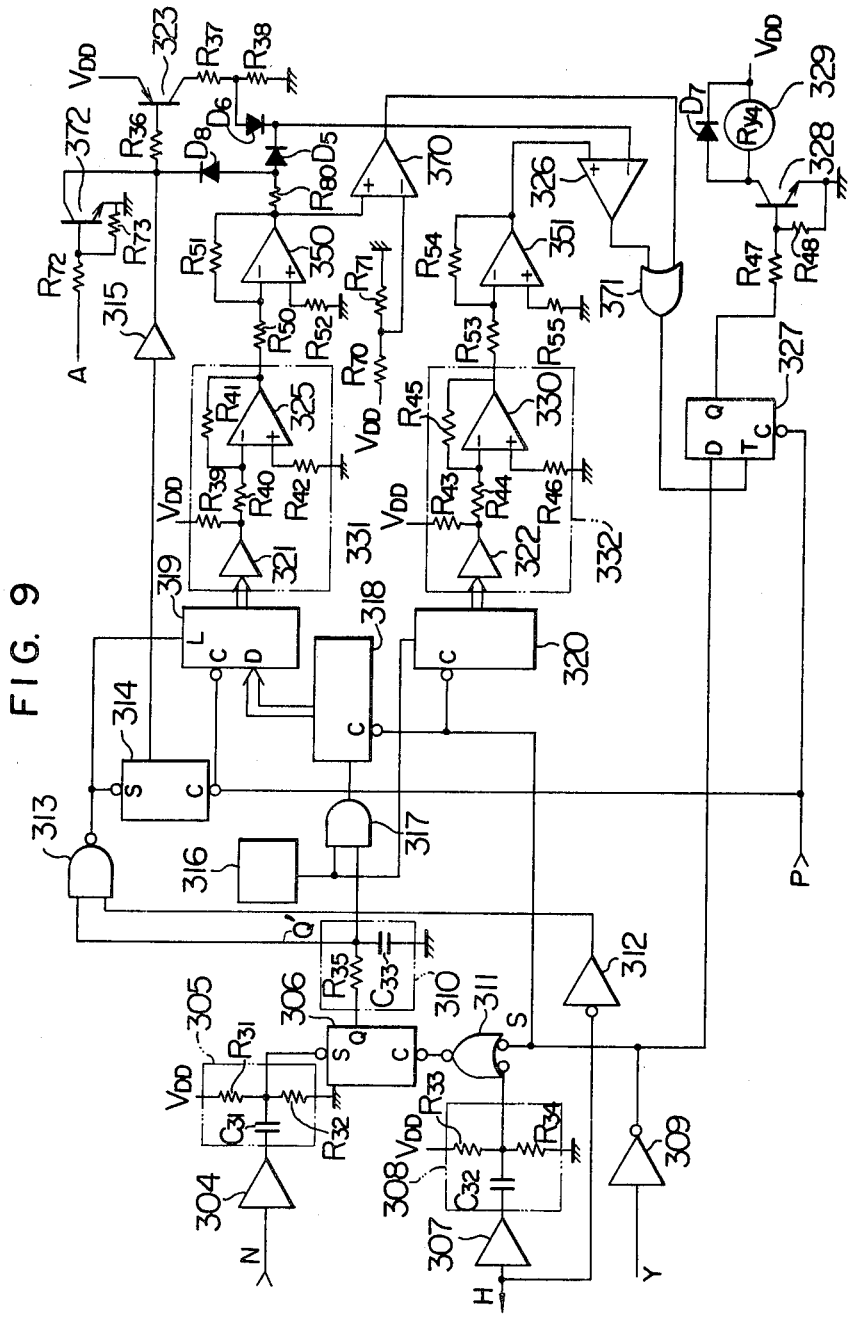
FIGS. 9 to 11 are diagrams for explaining the operation of the circuit of FIG. 6.
Figure 10:
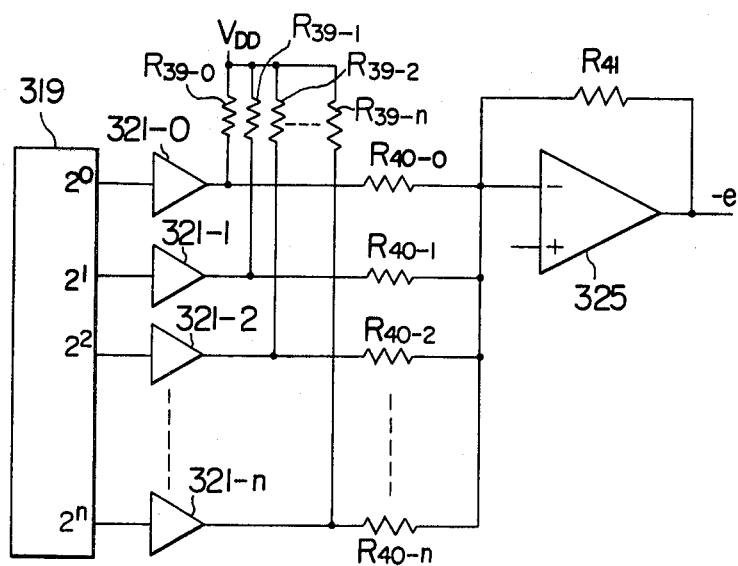
Figure 11:
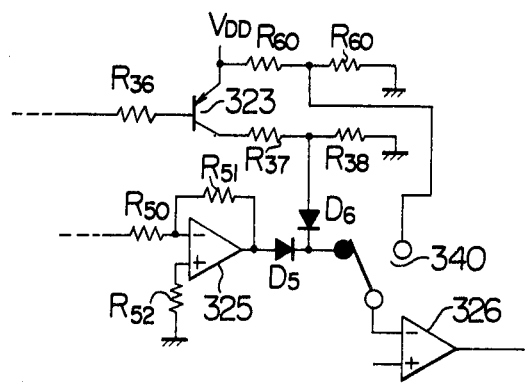

In the embodiment shown in FIGS. 9 to 11, as two specified sections of travel of the door, the time required for movement of the door between the upper limit switch 202 and the lower limit switch 203 making up specific switches positioned in the direction of movement and on the opposite side is counted, so that the resulting count is multiplied by a specified value such as the factor of 1.3 thereby to produce a comparison reference value.

Other functions mentioned below are also included.

(a) In the absence of data on movement in the specified two sections of door travel, the fixed set value (such as 30 seconds) described later is used as a reference value to be compared.

(b) In the case where the product of the count for the specified value and the factor of 1.3 is larger than the fixed set value, the case is processed as an abnormal one.

(c) In the event that the operating command is continuous (such as when the push button continues to be depressed), the fixed set value is given priority over the count for the two specified sections and is used as a reference value to be compared. This is effective when changing to a distance coverage larger than the count stored.

(d) The time count of movement is stored during movement from the upper limit switch 202 to the lower limit switch 203.

(e) When an abnormality is detected, the door is stopped.

The time of movement between the two limit switches is counted as mentioned below.

The output N of the NOT element 217 making up the output of the upper limit switch 202 is applied through the buffer element 304 to the differentiator circuit 305 as shown in FIG. 9.

This process is to detect that the door has begun to move from the stationary state at the position of the upper limit switch 202 and is performed in the timing as mentioned below.

The output of the upper limit switch 202 changes from on to off state when the door begins to move. The output N of the NOT element 217 changes from high to low level. The trailing edge of this output signal is differentiated at the differentiator circuit 305 through the buffer element 304, and the output of the differentiator 305 is used to set the flip-flop element 306.

The flip-flop element 306 is set at the beginning of the door movement time from the upper limit switch 202 and is reset by the lower limit switch 203. This is achieved as mentioned below.

First, the output signal H which is the inverse of the output of the lower limit switch 203 is applied to the buffer element 307. The trailing edge of the inverted signal H from high to low level, that is, from the turning off to on state of the lower limit switch 203 is differentiated at the differentiator circuit 308 through the buffer element 307, and the output of the differentiator circuit 308 is used to reset the flip-flop 306 through the 2-input AND element 311.

In the case of stoppage at other than the position of a limit switch, the flip-flop 306 is reset through the NOT element 309 (output S) and the 2-input AND element 311 by the output Y of the 2-input AND element 228 (FIG. 6).

Now, the operation of the circuit for counting the time of movement from the upper limit switch 202 to the lower limit switch 203 will be explained.

In the case where the flip-flop 306 is set, the output Q thereof changes to high level and is applied through the integrator circuit 310 to the 2-input AND element 317. (The function of the integrator circuit 310 will be explained later.)

The other input of the 2-input AND element 317 is impressed with the output of the oscillator circuit 316 (for instance, including two monostable multivibrators).

The output of the 2-input AND element 317 is counted by the counter 318. The value of the counter 318 represents the time of movement from the upper limit switch 202 to the lower limit switch 203. This counter 318 is reset when the door stops (output S).

Since the counter 318 is reset by the stoppage of the door, it is necessary to discriminate whether the count value of the counter 318 indicates the true time of movement between the two limit switches or whether it indicates the time of movement between the upper limit switch and an intermediate stop. The operation for this discrimination will be described briefly below.

When the door reaches the lower limit switch 203, the flip-flop 306 is immediately reset at the time of changing from the off to on state. Since the integrator circuit 310 mentioned above is added to the Q output of the input to the AND gate 317, however, the flip-flop 306 is maintained at high level for the discharge time of the capacitor C33 included in the circuit 310.

The resulting output Q' is applied to the 2-input NAND element 313, and further, from the NOT element 312, the output H is applied to the other input terminal thereof.

In this construction, only when the lower limit switch 203 operates with the flip-flop 306 set (the door started from the position of the upper limit switch 202), the output of the 2-input NAND element 313 falls for a certain period of time.

In response to the output of the 2-input NAND element 313, the value of the counter 318 is stored in the memory unit 319.

Another condition for resetting the counter 318 will be described. After a predetermined length of time following the turning on of the lower limit switch 203, the door stop command is issued (as already explained with reference to FIG. 6) and acts to reset the counter 318.

It should be noted that when the output of the 2-input NAND element 313 is produced, the value in the counter 318 is still maintained so that the memorizing of the counter value is assured.

Now, explanation will be made of the converter circuit 331 for multiplying the time for movement of the door between the limit switches stored in the memory unit 319 by a specified value and applying the output thereof to the comparator element 326. This converter circuit 331 is supplied with a comparison reference value generated on the basis of the count for the specified two sections.

The converter circuit 331 is for digital analog conversion and the detail thereof will be explained with reference to FIG. 10.

The outputs $2^0$ to $2^n$ of the memory unit 319 are applied to the buffer elements (open collector) 321-0 to 321-n of the buffer element 321. These signals are further applied through the input resistors R40-0 to R40-n of the resistor R40 in weighted binary form to an input of the operational amplifier element 325.

The relation between the output e of the operational amplifier element 325 and the feedback resistor R41 is as shown below.

$$-e \approx -(R41/R40 - 0) \cdot \text{V}DD - (R41/R40 - 1) \cdot \text{V}DD -$$

$$\ldots = -\sum_{i=0}^{n}(R41/R40 - i) \cdot \text{V}DD$$

(Any term is effective only when the associated output $2^i$ is at high level)

An example of the weighting is shown below.

|  |  |  | Weighting |
|---|---|---|---|
| R40 − n | = | 20 KΩ | n |
| R40 − (n − 1) | = | 40 KΩ | n − 1 |
| R40 − (n − 2) | = | 80 KΩ | n − 2 |
| . |  | . | . |
| . |  | . | . |
| . |  | . | . |

Specifically, the resistor R39 shown in FIG. 9 is smaller in value than the resistor R40 and is ignored in approximation in the above equations. In this way, the stored count (digital form) is converted to a corresponding analog value.

The output $-e$ is converted in sign and multiplied by a specified value, so that it is applied to the operational amplifier element 350 as shown in FIG. 9.

If the resistance ratio of the input resistor R50 and the feedback resistor R51 is set to 1:1.3, the output $e'$ of the operational amplifier element 350 is given as $$e' = -(-R51/R50 \cdot e) = 1.3e$$

It will be seen that the sign is converted while at the same time multiplying a specified value. This output is applied to the comparator element 370 as shown in FIG. 9.

The other input terminal of the comparator element 370 is supplied with the divided voltage value of the resistor R70 and the R71, which value is set to a fixed value (such as a value equivalent to 30 seconds) longer than the normal door movement time between both the switches. This arrangement is effective to prevent the memory from storing an abnormally long time value.

This output is applied to the 2-input OR element 371, and when it is detected, the process against an abnormality is effected.

The output of the operational amplifier element 350 is applied to the comparator element 326 through the resistor R80 and the diode D5. The other input terminal of the comparator element 326 is impressed with an analog value corresonding to the door distance coverage time. This process will be explained below.

First, a counter 320 is provided which is not reset during the movement of the door as shown in FIG. 9. This counter 320 is used to count the output pulses of the oscillator circuit 316 only during the door movement. This count is converted into an analog value by a converter circuit 332, and after being converted in sign at the operational amplifier element 351, is applied to the comparator element 326.

The converter circuit 332 is comprised of a buffer element 322 (open collector), an operational amplifier element 330 and resistors R43 to R36 as the circuit in FIG. 10, except for the fact that the ratio between the input resistor R53 of the operational amplifier element 351 and the feedback resistor R54 is 1 to 1 so that only sign conversion is effected in the latter case.

As mentioned above, in the event that the output of the comparator element 326 rises from low to high level, it is decided that an abnormality is involved. In other words, the door may operate for longer than the time obtained by multiplying the door movement time between the limit switches by a specified value, which never occurs under normal conditions.

This output is used to set the D-type flip-flop 327 through the 2-input OR element 371, the output of which in turn is used to drive the transistor 328, so that the relay 329 is driven and the relay contact 303 (FIG. 5) is opened thereby to stop the door.

Specifically, in the case where the door movement time is larger than the comparison reference value, the door operation is controlled through the door operating device, that is, the door is stopped in this particular case.

The D-type flip-flop 327 is reset by turning off and turning on again the power supply. The signal P shown in the drawing represents a reset signal obtained at the time of power throw-in, which is produced as signal P from the NOT element 216 shown in FIG. 6.

The door may operate in the case where power is turned on and the upper limit switch 202 is not yet turned on. In such a case, the output of the 2-input NAND element 313 is used to set the flip-flop 314. Since this flip-flop 314 is reset by the power reset signal P, the output of the flip-flop 314 indicates the history of door movement between both the limit switches, that is, whether the door has moved throughout the distance between the limit switches.

In the case where the flip-flop 314 is not set, namely, in the case where the history of movement between the limit switches is negative, the transistor 323 is driven through the buffer element 315 (open collector).

The voltage division due to the resistors R37 and R38 indicative of a fixed value of 30 seconds longer than the normal door movement time is applied through the diode D6 to the comparator element 326. These two resistors constitute means for forming a fixed reference value corresponding to the above-mentioned fixed value, and as described below, the set reference value is based on such a fixed reference value.

This value is maintained until the door movement time between the limit switches is stored in the memory unit 319.

The above-mentioned fixed value has the same effect as the comparison reference value based on the count for the specified two sections. That is, the set reference value is used in place of the comparison reference value for controlling the time of door movement. However, the set reference value is used under selected conditions as follows:

Specifically as mentioned above and as is obvious from FIG. 9, this fixed value is made up of a voltage divider of the resistors R37 and R38, and is applied through the diode D6 to the comparator circuit 326.

This process is limited to two cases, namely, the case where there is no affirmative history of the door movement between the limit switches (where the movement data is lacking) and the case where the transistor 372 is turned on (the conditions for and the object of the turning on of the transistor 327 will be described later).

As already described, the comparison reference value based on the count for the two specified sections is applied through the diode D5 and the resistor R80 to the comparator circuit 326. Thus the comparison reference value and the set reference value are coupled through the diodes D5 and D6, respectively, to the input of the comparator 326 and hence there occur no conflict between the two reference values. Alternatively, another switch (not shown) may be provided so that the set reference value may be supplied all the time.

Also, as shown in FIG. 11, another fixed value longer than the movement time (a divided value due to the resistor R60 and R61) may be supplied separately through a change-over switch 340.

Further, in order to improve the operability, the following functions may be added.

As mentioned above, if the two specified sections are stored in a small value erroneously, the push button switch 12 is depressed continuously. By so doing, the output A of the NOT element 214 shown in FIGS. 6 and 9 drives the transistor 372. Since the collector of this transistor 372 is connected to the cathode of the diode D8 and the resistor R36 as shown in the drawing, the transistor 323 is turned on so that the divided voltage value due to the resistors R37 and R38 is applied through the diode D6 to the comparator element 326.

Also, due to the fact that the cathode of the diode D8 is at ground potential, the anode potential of the diode D5 is substantially equal to ground potential, with the result that the comparison reference value based on the count is ignored and switched to use the set reference of a fixed value. In this way, the storage of the count may be updated without turning off the power.

According to the above-mentioned embodiment, the time is controlled on the basis of the door movement time between the door limit switches, and therefore if the condition detector means or the control circuit runs out of order, such a fault is rapidly detected thereby to stop the door, thus reducing the effect of the trouble to minimum.

In this embodiment, the output of the D-type flip-flop 327 upon detection of an abnormal condition may be used to drive the alarm means thereby to notify the person concerned of the inconvenience.

Also, the output of the D-type flip-flop 327 upon detection of an abnormal condition may be used to trigger another oscillator circuit (not shown) so that the output of such an oscillator circuit subjects the lamp relay 239 (Ry1) to on-off control thereby to notify the person concerned of the inconvenience.

Further, although the door is stopped upon detection of an abnormal condition according to the present embodiment, the object of the present invention requires the door to be controlled also to another state. The manners in which the door is to be controlled to meet this demand include the processes mentioned below, all of which are easily realizable by addition or change of, say, the relay circuit on the basis of the control system of the embodiment under consideration and are generally included in the basic control of the present invention.

(i) The door is reversed.

(ii) The door is stopped if in process of opening, and opened for a certain length of time if in process of closing.

(iii) The door is stopped if in process of opening, and opened if in process of closing.

In the case of reversing the direction of the door operation above, the door may be stopped for a predetermined length of time in the process.

The distance in movement for opening the door is shorter than the distance for the two specified sections, and so is the distance of reversing the direction of movement.

As shown in (iii) above, the operation of stopping the door if it is in process of opening, and opening it if it is in process is closing, is similar to the circuit operation in the case where the obstruction detection switch 204 is actuated. Therefore, in order to realize a control unit operated in the manner of (iii), the contact 303 of the relay Ry4 is removed from the power circuit of the motor 16 and connected in series with the obstruction detection switch 204.

In the above-mentioned embodiment, the digital-analog converter circuit 331 (FIG. 9) is basically made up of an adder circuit.

Specifically, by appropriately selecting the value of the feedback resistor R41, it is possible to determine an analog value of the output e equivalent to the product of the value stored in the memory unit 319 and the above-mentioned specified value.

In this case, the ratio between the feedback resistors R41 and the feedback resistor R45 of the digital-analog converter circuit 332 is set to 1.3 to 1. This process is followed by the sign conversion for comparison.

Alternatively, without converting the sign for the circuit, the outputs of the operational amplifier elements 325 and 330 may be compared with each other.

Figure 12:
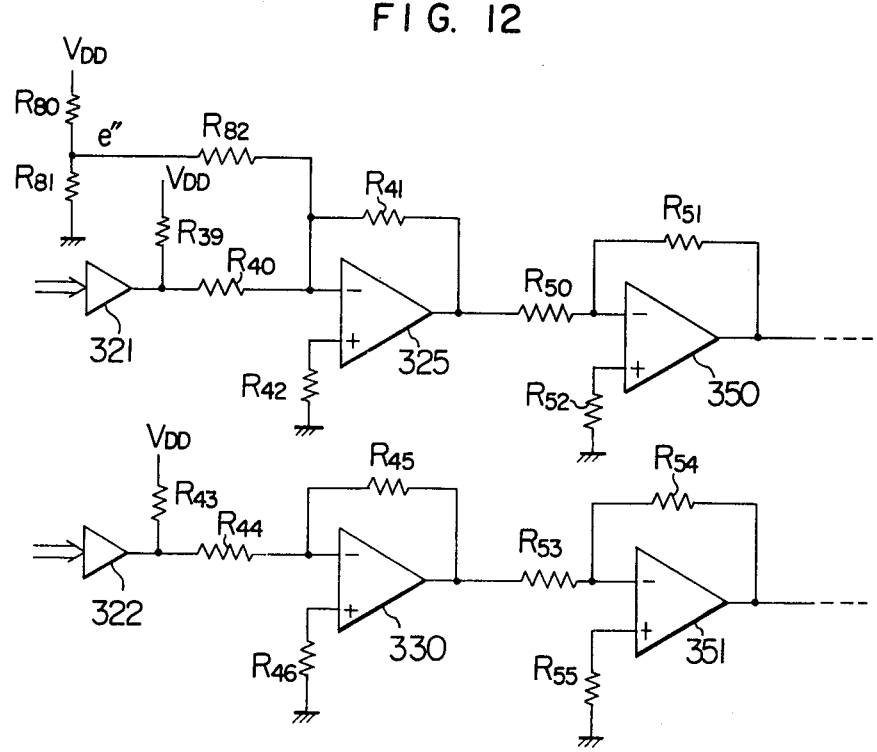
FIG. 12 is a diagram showing an example of the circuit according to another embodiment of the present invention.

An example of the circuit according to another embodiment is shown in FIG. 12.

In the aforementioned embodiment, the door movement time between the limit switches is multiplied by a specified value to produce the comparison reference value. The same effect is obtained by adding a specified value to the door movement time, as in the circuit illustrated in FIG. 12.

As described above, the output of the memory unit 319 is applied through the buffer element 321 and the binary-weighted resistor R40 to the operational amplifier element 325. This construction is provided by an adder circuit as already explained with reference to FIG. 10.

An input to this operational amplifier element 325 is provided by the voltage $e''$ divided by the resistors R80 and R81 in FIG. 12, which voltage is connected through the resistor R82. In this case, the output e of the operational amplifier element 325 is given by the equation $$-e \approx -\sum_{i=0}^{n} (R41/R40 - i) \cdot VDD - (R41/R82) \cdot e''$$

$$e'' = \{R81/(R80 + R81)\} \cdot -VDD$$

As will be seen, the term of $-(R41/R82) \cdot e''$ is added. In order for the value of this term to take a specified value such as 3 seconds, the values of $e''$ and the input resistor R80 are appropriately selected.

Further, the sign conversion is effected by the next operational amplifier element 350. By doing so, the comparison reference value is obtained as the door movement time between the limit switches +3 seconds. The remaining circuits are the same as in FIG. 9. However, the output of the operational amplifier element 325 in the above-mentioned circuits takes a negative sign of the comparison reference value so that the circuit arrangement may be composed without sign conversion.

Another embodiment, though not shown, may give the same functions in which the comparison is carried out by digital technique using the converter circuits 331 and 332, in place of analog technique. In this case, a digital comparator, a counter and an operational element (ALU) may be used.

In the above-mentioned embodiments, the upper limit switch 202 and the lower limit switch 203 are used for setting and resetting of the time counting means, which continues its counting operation under the set condition. These setting and resetting operations may be reversed or may be used parallelly with equal effect by slightly modifying the circuits. Such a modification will be easily realized without any detailed description.

If the above-mentioned embodiments are configured to include a microcomputer, the processes described above may be performed with a smaller circuit construction.

It will thus be understood that according to the present invention, even in the case where the condition detector means or the control circuit run out of order, the load on the obstruction is released within a predetermined length of time, thus providing a door operation control apparatus with a greatly improved reliability and safety.

What is claimed is:

1. A door operation control system comprising a door operating device including a driving unit for driving a door and connector means for connecting said driving unit to said door, and a control unit for issuing a predetermined command signal to said door operating device to control movement of said door, said control unit comprising counter means for counting the time of door operation, section detector means for counting the time of door movement from one end to the other end of a specified section of travel thereof, memory means for storing the count detected by said section detector means, means for producing a comparison reference value which is determined as a function of said count stored in said memory means, and means for comparing said count detected by said counter means with said comparison reference value and providing a command signal in the form of a door operating condition control signal to said door operating device when the count thereof exceeds said comparison reference value.

2. A door operation control system according to claim 1, wherein said comparison reference value producing means includes means for adding a specified value to the count detected by said section detector means.

3. A door operation control system according to claim 1, wherein said comparison reference value producing means includes means for multiplying a specified value by the count detected by said section detector means.

4. A door operation control system according to claim 1, wherein said control unit includes door operation command means for generating a door command output, and means responsive to continuous receipt of an output from said door operation command means for inhibiting door operation control on the basis of the output of the comparison reference value producing means.

5. A door operation control system according to claim 1, including means reponsive to said door operating condition control signal for stopping the door operation when the count by said counter means exceeds said comparison reference value.

6. A door operation control system comprising a door operating device including a driving unit for driving a door and connector means for connecting said driving unit with said door, and a control unit for issuing a predetermined command signal to said door operating device to control movement of said door, wherein said control unit comprises counter means for counting the door operation time, section detector means for counting the time of door movement from one end to the other end of a specified section of travel thereof, memory means for storing the count detected by said section detector means, means for setting a fixed reference value and a fixed set value, each being longer than a value representing the normal door movement time through said specified section of travel by a predetermined amount, means for producing a comparison reference value which is determined as a function of said count stored in said memory means, means for producing a set reference value which is determined as a function of said fixed reference value, means for comparing said count detected by said counter means with said comparison reference value or said set reference value whichever is larger than the other and providing a command signal in the form of a door operating condition control signal to said door operating device when the count thereof exceeds said comparison reference value or said set reference value, and means for comparing said comparison reference value with said fixed set value and providing a command signal in the form of a door operating condition control signal to said door operating device when the comparison reference value exceeds said fixed set value.

7. A door operation control system according to claim 6, wherein said comparison reference value producing means includes means for adding a specified value to the count detected by said section detector means.

8. A door operation control system according to claim 6, wherein said comparison reference value producing means includes means for multiplying a specified value by the count detected by said section detector means.

9. A door operation control system according to claim 6, wherein said control unit includes door operation command means for generating a door command output, and means responsive to continuous receipt of an output from said door operation command means for applying the set reference value based on said fixed reference value to said comparing means for said comparison operation.

10. A door operation control system according to claim 6, including means responsive to the absence of the count detected by said section detector means and hence the comparison reference value for applying said set reference value based on the fixed reference value to said comparing means for said comparison operation.

11. A door operation control system according to claim 6, including means responsive to said door operating condition control signal for stopping the door operation when the count of said counting means exceeds said comparison reference value or said set reference value.

12. A door operation control system according to claim 6, including means responsive to said door operating condition control signal for stopping the door operation when said comparison reference value exceeds said fixed set value.

* * * * *